United States Patent
Harter

(10) Patent No.: US 11,840,185 B2
(45) Date of Patent: Dec. 12, 2023

(54) FRONT END PART

(71) Applicant: Dr. Ing. h.c. F. Porsche Aktiengesellschaft, Stuttgart (DE)

(72) Inventor: Sebastian Harter, Weissach (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 0 days.

(21) Appl. No.: 17/184,651

(22) Filed: Feb. 25, 2021

(65) Prior Publication Data
US 2021/0268978 A1 Sep. 2, 2021

(30) Foreign Application Priority Data
Mar. 2, 2020 (DE) ...................... 10 2020 105 451.3

(51) Int. Cl.
*B60R 19/48* (2006.01)
*B60R 19/02* (2006.01)
*B60K 11/08* (2006.01)

(52) U.S. Cl.
CPC ............ *B60R 19/48* (2013.01); *B60K 11/085* (2013.01); *B60R 19/023* (2013.01); *B60R 2019/486* (2013.01)

(58) Field of Classification Search
CPC . B60R 19/48; B60R 19/023; B60R 2019/486; B60K 11/085; Y02T 10/88
See application file for complete search history.

(56) References Cited

U.S. PATENT DOCUMENTS

| | | | |
|---|---|---|---|
| 6,743,089 B2* | 6/2004 | Driller | B60H 1/34 454/155 |
| 9,250,020 B2* | 2/2016 | Vikstrom | F28D 1/0443 |
| 10,071,625 B1* | 9/2018 | Stoddard | B60K 11/02 |
| 10,160,308 B2* | 12/2018 | Chae | B60T 5/00 |
| 10,351,181 B2* | 7/2019 | McKillen | B62D 35/00 |
| 10,569,643 B2* | 2/2020 | Gilotte | B60K 11/08 |
| 10,941,694 B2 | 3/2021 | Ritz | |

(Continued)

FOREIGN PATENT DOCUMENTS

DE 3003568 A1 8/1981
DE 102011119542 A1 5/2013

(Continued)

*Primary Examiner* — Kurt Philip Liethen
(74) *Attorney, Agent, or Firm* — LEYDIG, VOIT & MAYER, LTD.

(57) ABSTRACT

A front end part is for a motor vehicle. The front end part has: a front end part outer skin element, which has an air inlet opening, the air passage opening being closeable by a closure device, the closure device having a closure element, which is adjustable between a closed position and an open position; and a protective element, which is arranged adjacent to the air inlet opening in a transverse direction of the motor vehicle and projects in front of the front end part outer skin element in a longitudinal direction of the motor vehicle. The closure element in the closed position is arranged flush with the front end part outer skin element. The front end part outer skin element and the protective element, arranged in front of the front end part outer skin element in the longitudinal direction of the motor vehicle, delimit an air duct.

14 Claims, 2 Drawing Sheets

(56) References Cited

U.S. PATENT DOCUMENTS

| | | | | |
|---|---|---|---|---|
| 2002/0153182 | A1* | 10/2002 | Vaillancourt | B62J 17/02 |
| | | | | 180/68.1 |
| 2012/0074729 | A1* | 3/2012 | Fenchak | B60K 11/085 |
| | | | | 296/193.1 |
| 2012/0168125 | A1* | 7/2012 | Johnston | F28D 1/0443 |
| | | | | 165/96 |
| 2012/0247018 | A1* | 10/2012 | Stokes | B60K 11/085 |
| | | | | 49/89.1 |
| 2013/0068403 | A1* | 3/2013 | Fenchak | B60K 11/085 |
| | | | | 160/218 |
| 2016/0016617 | A1* | 1/2016 | Wolf | B60K 11/04 |
| | | | | 296/208 |
| 2017/0136872 | A1* | 5/2017 | Ribaldone | B62D 37/02 |
| 2018/0056909 | A1* | 3/2018 | Sedique | B60R 19/50 |

FOREIGN PATENT DOCUMENTS

| | | | |
|---|---|---|---|
| DE | 102012108903 A1 | 4/2014 | |
| DE | 102013107974 A1 * | 2/2015 | B60K 11/085 |
| DE | 102013113489 A1 | 6/2015 | |

* cited by examiner

FRONT END PART

CROSS-REFERENCE TO PRIOR APPLICATIONS

Priority is claimed to German Patent Application No. DE 10 2020 105 451.3, filed on Mar. 2, 2020, the entire disclosure of which is hereby incorporated by reference herein.

FIELD

The present invention relates to a front end part of a motor vehicle.

BACKGROUND

DE 10 2012 108 903 A1 discloses a front end part of a motor vehicle, the front end part having an outer skin element. The outer skin element comprises a plurality of air passage openings via which air can flow to a radiator or to a brake that is to be cooled. The air passage openings are closeable by a respective closure device, wherein the closure devices have a plurality of pivotable closure elements which can be pivoted between a closed position and an open position. In the open position of the closure elements, air flows through the air passage openings to the radiator. In the closed position of the closure elements, the air is diverted around the motor vehicle, as a result of which the drag coefficient of the motor vehicle falls and the fuel consumption of the motor vehicle is thus reduced.

In order to ensure pedestrian protection in the event of a head-on crash with a pedestrian and in order to perform an associated "pendulum test", a respective protective element is provided at each air outlet opening, said protective elements being adjacent to the air passage opening in the transverse direction of the motor vehicle and protruding from the outer skin element in the longitudinal direction of the motor vehicle. During the pendulum test, the front end part is loaded by means of a pendulum or a ramming truck, wherein the loading corresponds to an impact on the front end part at a speed of 2.5 km/h or 4 km/h and represents an impact on the front end part at low speeds. The loading should neither cause the front end part to be deformed in such a manner that sharp edges arise, nor should components of the front end part become detached. During the pendulum test, the front end part is loaded by the pendulum or the ramming truck, inter alia, at an angle of 30° with respect to the longitudinal axis of the motor vehicle, wherein, at such an angle, the pendulum or the ramming truck impacts against the closure elements and there is the risk of the latter becoming detached and protruding as sharp fixtures. Such a detaching or protrusion of the closure elements is prevented by the protective element, wherein the protective element protrudes from the outer skin element and thereby covers the closure elements at a 30° loading in such a manner that the loading acts only on the protective element and not on the closure elements.

A disadvantage of such a protective element protruding from the outer skin element is that the protective element causes swirling of the air flowing around the motor vehicle, thus causing a deterioration in the drag coefficient, i.e. the coefficient of flow resistance. This is the case in particular if the closure elements are arranged in the closed position, with the air being diverted outward by the closure elements and thus in the direction of the protective element, and the diverted air impacting on the closure element. The protruding protective element causes the air to be greatly diverted and causes swirling to arise. Furthermore, a deterioration in the drag coefficient is caused if the closure elements are arranged offset from the outer skin of the front end part in the longitudinal direction of the motor vehicle, i.e. shifted inward into the front end part.

SUMMARY

In an embodiment, the present invention provides a front end part for a motor vehicle. The front end part has: a front end part outer skin element, which has at least one air inlet opening, the air passage opening being closeable by a closure device, the closure device having at least one closure element, which is adjustable between a closed position and an open position; and a protective element, which is arranged adjacent to the air inlet opening in a transverse direction of the motor vehicle and projects in front of the front end part outer skin element in a longitudinal direction of the motor vehicle. The closure element in the closed position is arranged flush with the front end part outer skin element. The front end part outer skin element and the protective element, arranged in front of the front end part outer skin element in the longitudinal direction of the motor vehicle, delimit an air duct.

BRIEF DESCRIPTION OF DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
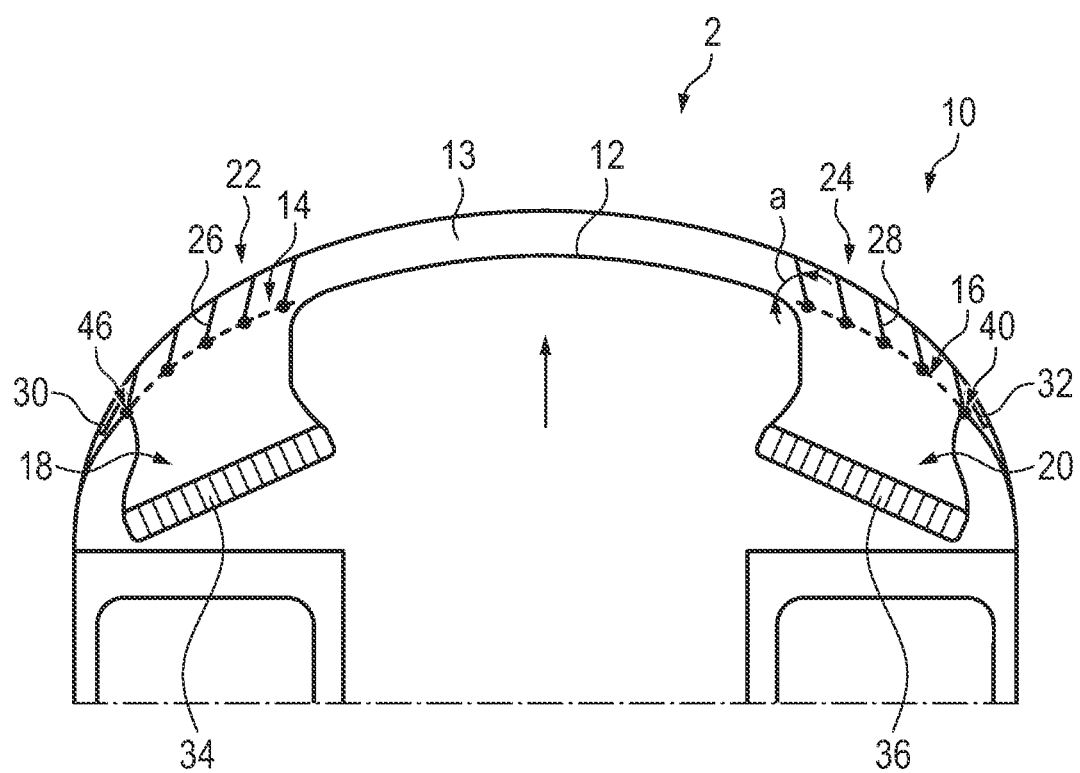
FIG. 1 shows a front end part of a motor vehicle in longitudinal section.

In an embodiment, the present invention provides a front end part, which has a low drag coefficient and complies with damage to the front end part as per the pendulum test.

Owing to the fact that the closure element in the closed position is arranged flush with the front end part outer skin element, and the front end part outer skin element and the protective element arranged in front of the front end part outer skin element in the longitudinal direction of the motor vehicle delimit an air duct, the motor vehicle has a low drag coefficient, with a detaching and/or protruding of components of the front end part due to a front end part impact at a low speed being reliably prevented. The low drag coefficient is firstly achieved in that the closure elements in the closed position are arranged flush with the outer skin, as a result of which the swirling caused in the closed position of the closure elements by the edge portion protruding in the longitudinal direction of the motor vehicle and bounding the air passage opening is avoided. Secondly, the drag coefficient is reduced by air flowing against the protective element from behind, wherein the air flow which is diverted in the direction of the protective element by the closure elements arranged in the closed position flows through the air duct formed between the protective element and the outer skin element, and therefore the air flow is not deflected by the protective element and no swirling is therefore caused.

Air flows preferably through the air duct in the open position and in the closed position of the closure element, as a result of which a low drag coefficient can be obtained both in the closed position and in the open position.

The air duct preferably extends substantially in the transverse direction of the motor vehicle, as a result of which the air flow flowing against the front end part can be guided better around the front end part.

The protective element at its ends oriented in the vertical direction of the motor vehicle is preferably adjacent to the front end part outer skin element so as to be flush therewith, the protective element having a curved shape and a flush transition between the protective element and the outer skin element thus being present in the vertical direction of the motor vehicle. This avoids sharp edges, as a result of which pedestrian safety is increased and the drag coefficient is reduced.

In a preferred refinement, the closure element is pivotable about a vertical axis for the adjustment between the open position and the closed position. The closure device preferably has a drive unit which is operatively connected to the at least one closure element, wherein the drive unit is arranged above or below the closure element in the vertical direction of the motor vehicle. The construction space in the front region of the motor vehicle is limited since a multiplicity of components have to be arranged in the front region. Below or above the closure element there is sufficient construction space which can be used for the arrangement of the drive unit. The vertical orientation of the closure element enables the drive unit to simply be coupled to the closure element, with no additional deflecting components being required.

The closure element in the open position preferably has an opening angle of at maximum 45° relative to the closed position. The closure element can thereby be oriented in the air flow and the drag coefficient can thus be reduced in the open position of the closure element, wherein, at an opening angle of greater than 45°, the air duct would be partially or completely blocked by a closure element and a separation of the air flow would result therefrom.

In a preferred refinement, two air inlet openings, which are closeable by a respective closure device, are provided, wherein a first air inlet opening is arranged in a first edge region of the front end part outer skin element, and a second air inlet opening is arranged in a second edge region thereof opposite the first edge region, wherein a respective protective element is arranged adjacent on the outside to the air inlet opening in the transverse direction of the motor vehicle. More cooling air for cooling components can thereby be introduced, with the drag coefficient of the motor vehicle not being worsened by the two air inlet openings and the protective elements.

A front end part is thus created which reliably prevents detaching and/or protruding of components of the front end part due to an impact at a low speed and the motor vehicle nevertheless has a low drag coefficient.

Figure 2:
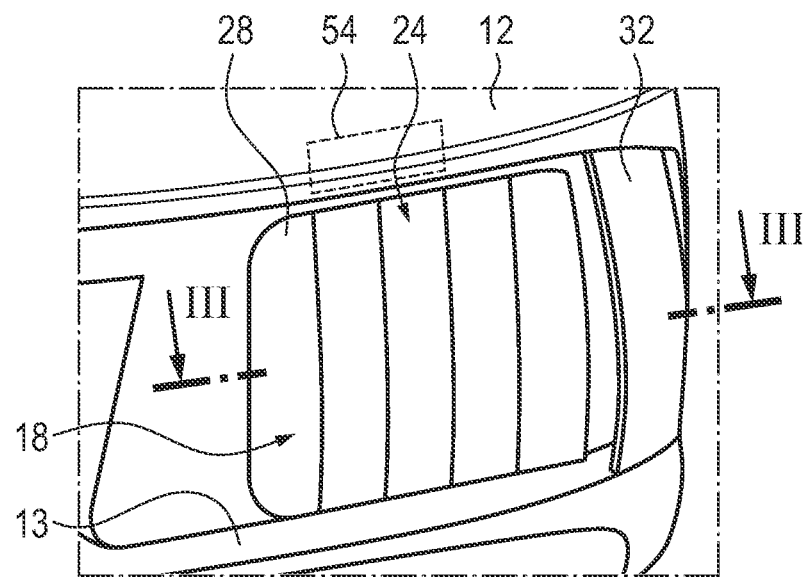
FIG. 2 shows the front end part from FIG. 1 in a perspective view.
Figure 3:
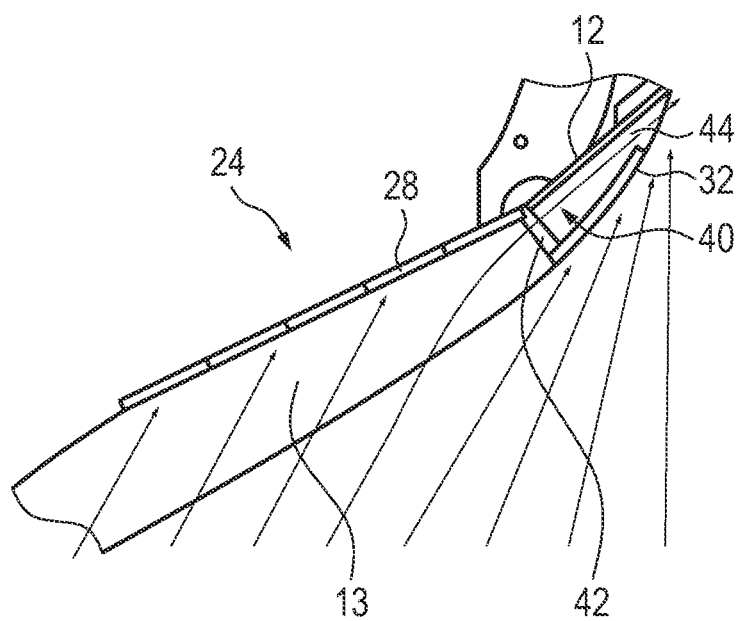
FIG. 3 shows a detail of the front end part from FIG. 1 in longitudinal section.

FIGS. 1, 2, and 3 show a front end part 10 of a motor vehicle 2. The front end part 10 comprises a front end part outer skin element 12, which serves for covering the front end region of the motor vehicle 2 and forms part of the outer skin of the motor vehicle 2.

The front end part outer skin element 12 conventionally has a middle air inlet opening and two outer air inlet openings 14, 16. Air can flow in through the air inlet openings, in particular through the outer air inlet openings 14, 16, and can flow via a respective air duct 18, 20 to a respective radiator 34, 36. The air flowing through the radiators 34, 36 serves as cooling air which is thermally connected via the radiators 34, 36 to a coolant, wherein the coolant flows through a motor vehicle component that is to be cooled.

The air inlet openings 14, 16 are closeable by means of a respective closure device 22, 24. Each closure device 22, 24 comprises a plurality of closure elements 26, 28 and a drive unit 54, which is arranged above the closure elements 26, 28 in the vertical direction of the vehicle and is shown in FIG. 2. The closure elements 26, 28 are operatively connected to a respective drive unit 54 via respective adjustment kinematics. When the drive unit 54 is actuated, the closure elements 26, 28 can be adjusted about a vertical axis between a closed position and an open position. In the open position, the closure elements 26, 28 can be adjusted up to an opening angle a of 45° relative to the closed position. In the closed position, the closure elements 26, 28 are arranged flush with the front end part outer skin element 12 such that the air impacting against the front end part 10 during travel of the motor vehicle 2 can be diverted without swirling and, as a result, the drag coefficient of the motor vehicle 2 can be improved.

In order to ensure pedestrian protection in the event of a head-on impact of the pedestrian against the front end part 10 of the motor vehicle 2 and in order to perform a "pendulum test", a respective protective element 30, 32 is provided at each air outlet opening 14, 16, said protective elements being adjacent to the air passage opening 14, 16 in the transverse direction of the motor vehicle and protruding from the front end part outer skin element 12 in the longitudinal direction of the motor vehicle.

During the pendulum test, the front end part 10 is loaded by means of a pendulum or a ramming truck, wherein the loading corresponds to an impact against the front end part 10 at a speed of 2.5 km/h or 4 km/h and represents an impact against the front end part 10 at low speeds. The loading should not deform the front end part 10 either in such a manner that sharp edges arise, nor should components of the front end part 10 become detached. During the pendulum test, the front end part 10 is loaded by the pendulum or the ramming truck, inter alia, at an angle of 30° with respect to the longitudinal direction of the motor vehicle. At such an angle, the pendulum or the ramming truck strikes against the closure elements 26, 28, and there is the risk of the latter becoming detached and forming sharp, protruding edges that constitute a risk of injury for the pedestrian.

Such a detaching or protrusion of the closure elements 26, 28 is prevented by the protective element 30, 32. The protective element 30, 32 protrudes from the front end part outer skin element 12, and thus, at a 30° loading, covers the closure elements 26, 28 in such a manner that the loading acts only on the protective element 30, 32 and not on the closure elements 26, 28. The protective elements 30, 32 at their ends oriented in the vertical direction of the vehicle adjoin the front end part outer skin element 12 so as to be flush therewith. The protective element 30, 32 at the end facing the carriageway adjoins a spoiler lip 13 of the front end part outer skin element 12, the spoiler lip protruding in the longitudinal direction of the vehicle.

The protective elements 30, 32 protruding from the front end part outer skin element 12 would cause swirling of the air flowing around the motor vehicle 2, which would cause a deterioration in the drag coefficient. In order to avoid a deterioration in the drag coefficient, air flows against the protective elements 30, 32 from behind, wherein the front end part outer skin element 12 and the inner surface of the protective elements 30, 32 in each case delimit an air duct 40, 46. Such an air duct 40 is illustrated in particular in FIG. 3 at the air inlet 42. The air duct 40 is oriented substantially in the transverse direction of the motor vehicle and has an air inlet 42 and an air outlet 44, wherein the air inlet 42 is arranged at the end facing the closure element 28 and the air outlet 44 is arranged at the end facing away from the closure element 28. The air duct 40 is designed tapering from the air inlet 42 to the air inlet.

During travel of the motor vehicle 2, the closure devices 22, 24 can close the air inlet openings 14, 16. The air impacting against the front end part outer skin element 12 is guided here outward in the transverse direction of the motor vehicle and around the motor vehicle 2 by the closure elements 26, 28, which are arranged flush with the front end part outer skin element 12 in the closed position, and by the air ducts 40, 46, with no swirling that causes a deterioration in the drag coefficient arising because of the protective elements 30, 32. In the open position of the closure elements 26, 28, the air flows to the radiators 34, 36 and through the air ducts 40, 46. The closure elements 26, 28 can be opened here only up to an opening angle a of 45° so that the air ducts 40, 46 are not closed by the closure elements 26, 28 and a deterioration in the drag coefficient is thereby caused.

Other structural embodiments than the embodiments described and which fall within the scope of protection of the main claim are also possible.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C

The invention claimed is:

1. A front end part of a motor vehicle, the front end part comprising:
    a front end part outer skin element, which has at least one air inlet opening, wherein the at least one air inlet opening is closeable by a closure device, wherein the closure device has at least one closure element which is adjustable between a closed position and an open position; and
    a protective element, which is arranged adjacent to the at least one air inlet opening in a transverse direction of the motor vehicle and projects in front of the front end part outer skin element in a longitudinal direction of the motor vehicle, wherein the protective element at its ends oriented in a vertical direction of the motor vehicle is adjacent to the front end part outer skin element so as to be flush therewith and thereby form an even and level surface where the protective element and the front end part outer skin element meet,
    wherein the closure element in the closed position is arranged flush with the front end part outer skin element, and
    wherein the front end part outer skin element and the protective element arranged in front of the front end part outer skin element in the longitudinal direction of the motor vehicle delimit an air duct.

2. The front end part as claimed in claim 1, the front end part being configured such that air flows through the air duct in the open position and is diverted in the closed position of the closure element.

3. The front end part as claimed in claim 1, wherein the air duct extends substantially in the transverse direction of the motor vehicle.

4. The front end part as claimed in claim 1, wherein the closure element is pivotable about a vertical axis for the adjustment between the open position and the closed position.

5. The front end part as claimed in claim 1,
    wherein the closure device has a drive unit, which is operatively connected to the at least one closure element, and
    wherein the drive unit is arranged above or below the closure element in a vertical direction of the motor vehicle.

6. The front end part as claimed in claim 1, wherein the closure element in the open position has an opening angle of at maximum 45° relative to the closed position.

7. The front end part as claimed in claim 1,
    wherein the front end part outer skin element comprises two air inlet openings,
    wherein the two air inlet openings are closeable by a respective one of a plurality of closure devices, the closure devices comprising the closure device,
    wherein a first air inlet opening of the two air inlet openings is arranged in a first edge region of the front end part outer skin element,
    a second air inlet opening of the two air inlet openings is arranged in a second edge region of the front end part outer skin element opposite the first edge region, and
    wherein a respective one of a plurality of protective elements, which comprise the protective element, is arranged adjacent on an outside to a respective one of the two air inlet openings in the transverse direction of the motor vehicle.

8. The front end part as claimed in claim 1, wherein an outer surface of the protective element is coincident with an outer periphery of the front end part outer skin element.

9. The front end part as claimed in claim 1, wherein the air duct extends through a space between the front end part outer skin element and the protective element.

10. A front end part of a motor vehicle, the front end part comprising:
- a front end part outer skin element, which has at least one air inlet opening, wherein the at least one air inlet opening is closeable by a closure device, wherein the closure device has at least one closure element which is adjustable between a closed position and an open position; and
- a protective element, which is arranged adjacent to the at least one air inlet opening in a transverse direction of the motor vehicle and projects in front of the front end part outer skin element in a longitudinal direction of the motor vehicle, wherein the protective element at its ends oriented in a vertical direction of the motor vehicle is adjacent to the front end part outer skin element so as to be flush therewith and thereby form an even and level surface where the protective element and the front end part outer skin element meet,
- wherein the closure element in the closed position is arranged flush with the front end part outer skin element,
- wherein the front end part outer skin element and the protective element arranged in front of the front end part outer skin element in the longitudinal direction of the motor vehicle delimit an air duct,
- wherein the front end part is configured such that air flows through the air duct in the open position and is diverted in the closed position of the closure element, and
- wherein air that is diverted in the closed position of the closure element is configured to pass through an air duct inlet between the front end part outer skin element and the protective element.

11. The front end part as claimed in claim 10, wherein air that is diverted in the closed position of the closure element is further configured to pass through an air duct outlet between the front end part outer skin element and the protective element, and subsequently diverted along an outer periphery of the front end part outer skin element and external to the motor vehicle.

12. The front end part as claimed in claim 10, wherein the air that is diverted in the closed position of the closure element is configured to pass through an air duct outlet between the front end part outer skin element and the protective element, the air passing through the air duct outlet being further configured to pass along an outermost periphery of the motor vehicle.

13. The front end part as claimed in claim 10, wherein the front end part outer skin element is configured to cover the front end region of the motor vehicle and form an outer skin of the motor vehicle.

14. The front end part as claimed in claim 13, wherein the front end part outer skin element is configured to be impinged upon by air external to the motor vehicle before the air external to the motor vehicle is diverted by the closure element.

* * * * *